United States Patent
Handte et al.

(10) Patent No.: US 12,396,031 B2
(45) Date of Patent: Aug. 19, 2025

(54) COMMUNICATION DEVICES AND METHODS

(71) Applicant: Sony Group Corporation, Tokyo (JP)

(72) Inventors: Thomas Handte, Stuttgart (DE); Dana Ciochina, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 179 days.

(21) Appl. No.: 17/429,625

(22) PCT Filed: Feb. 26, 2020

(86) PCT No.: PCT/EP2020/055060
§ 371 (c)(1),
(2) Date: Aug. 10, 2021

(87) PCT Pub. No.: WO2020/174020
PCT Pub. Date: Sep. 3, 2020

(65) Prior Publication Data
US 2022/0116997 A1    Apr. 14, 2022

(30) Foreign Application Priority Data

Feb. 27, 2019 (EP) .................................... 19159682

(51) Int. Cl.
H04W 74/08     (2024.01)
H04W 74/00     (2009.01)
H04W 74/0816   (2024.01)

(52) U.S. Cl.
CPC ..... H04W 74/0816 (2013.01); H04W 74/002 (2013.01)

(58) Field of Classification Search
CPC ........... H04W 74/002; H04W 74/0816; H04W 74/0825
See application file for complete search history.

(56) References Cited

U.S. PATENT DOCUMENTS 9,565,593 B2 *  2/2017  Bhushan ............... H04L 1/0612
9,918,336 B2 *  3/2018  Verma .................. H04W 72/04
(Continued)

FOREIGN PATENT DOCUMENTS

CN    1462524 A    12/2003
CN    101960874 A    1/2011
(Continued)

OTHER PUBLICATIONS

International Search Report and Written Opinion mailed on May 20, 2020, received for PCT Application PCT/EP2020/055060, Filed on Feb. 26, 2020, 11 pages.
IEEE, "Part 11: Wireless LAN Medium Access Control (MAC) and Physical Layer (PHY) Specifications", IEEE Std 802.11_2012, IEEE Standard Association, IEEE Computer Society, Mar. 29, 2012, pp. 1-2695.
(Continued)

Primary Examiner — Liton Miah
(74) Attorney, Agent, or Firm — XSENSUS, LLP

(57) ABSTRACT

A first communication device comprising circuitry configured to exchange data with one or more second communication devices on a first communication channel, and transmit collision information on a second communication channel that is a different channel than the first communication channel, wherein the circuitry is configured to transmit said collision information if there is a collision on the first communication channel or if the first communication channel is occupied by data transmission of a second communication device, said collision information indicating that there is a collision on the first communication channel or that the first communication channel is occupied.

20 Claims, 14 Drawing Sheets

(56) References Cited

U.S. PATENT DOCUMENTS

| | | | |
|---|---|---|---|
| 12,120,661 B2* | 10/2024 | He | H04W 72/0446 |
| 2003/0123405 A1 | 7/2003 | Del Prado | |
| 2008/0318527 A1* | 12/2008 | Higuchi | H04L 5/003 |
| | | | 455/42 |
| 2009/0219905 A1 | 9/2009 | Khandekar | |
| 2010/0054145 A1* | 3/2010 | Frenger | H04W 72/542 |
| | | | 370/252 |
| 2011/0222493 A1 | 9/2011 | Mangold et al. | |
| 2013/0201974 A1 | 8/2013 | Merlin | |
| 2014/0269524 A1 | 9/2014 | Xiao | |
| 2015/0009881 A1* | 1/2015 | Yeh | H04W 72/30 |
| | | | 370/312 |
| 2016/0088657 A1 | 3/2016 | Djukic et al. | |
| 2017/0134292 A1* | 5/2017 | Kellermann | H04L 47/245 |
| 2017/0257890 A1 | 9/2017 | Biswas et al. | |
| 2018/0242362 A1 | 8/2018 | Kim | |

FOREIGN PATENT DOCUMENTS

| | | |
|---|---|---|
| CN | 107005854 A | 8/2017 |
| CN | 107743722 A | 2/2018 |
| EP | 1228603 A2 | 8/2002 |
| EP | 2986066 A1 | 2/2016 |
| WO | 01/33770 A2 | 5/2001 |
| WO | WO-2014019116 A1 | 2/2014 |
| WO | WO-2014163888 A1 | 10/2014 |

OTHER PUBLICATIONS

Yang et al., "A Dual Channel Mac Protocol for Providing High Spatial Reuse and Channel Efficiency", The 1st International Conference on Information Science and Engineering (ICISE2009), 2009, pp. 3930-3935.

* cited by examiner

COMMUNICATION DEVICES AND METHODS

CROSS-REFERENCE TO RELATED APPLICATIONS

The present application is based on PCT filing PCT/EP2020/055060, filed Feb. 26, 2020, which claims the priority of European patent application no. EP 19159682.4, filed Feb. 27, 2019, the contents of each are hereby incorporated by reference.

BACKGROUND

Field of the Disclosure

The present disclosure relates to first and second communication devices and method, in particular for use in wireless communication.

Description of Related Art

In unlicensed bands, communication devices are required to share bandwidth with each other. For that reason, regulatory bodies often impose listen-before-talk (LBT) that enforces communication devices to listen to or sensing the wireless medium before transmitting any data. If the medium is sensed as busy, a communication device defers its transmission to a later point in time. The rationale behind this is to avoid collisions, i.e. transmissions by two or more communication devices at the same time. Unfortunately, this concept is not sufficient to provide a collision-free communication. The main reason is that in a spatially distributed system some communication devices may not hear other communication devices which are, however, part of the current data exchange. This is often referred to as the hidden-node problem. Communication mechanisms such as beamforming may augment the number of hidden nodes since directional data transmission focuses transmit power in narrow spatial directions. Another reason is that communication devices operating in unlicensed bands may use different principles to establish communication between nodes.

For these reasons, congestion of the wireless medium is a limiting factor in achieving low-latency communication. In addition, in a congested environment, the overhead for collision resolution becomes high, which lowers the data throughput.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly nor impliedly admitted as prior art against the present disclosure.

SUMMARY

It is an object to provide communication devices and methods that are configured to effectively avoid collisions or at least weaken their effect.

According to a first aspect there is provided a first communication device comprising circuitry configured to
    exchange data with one or more second communication devices on a first communication channel, and
    transmit collision information on a second communication channel that is a different channel than the first communication channel,
wherein the circuitry is configured to transmit said collision information if there is a collision on the first communication channel or if the first communication channel is occupied by data transmission of a second communication device, said collision information indicating that there is a collision on the first communication channel or that the first communication channel is occupied.

According to a further aspect there is provided a second communication device comprising circuitry configured to
    exchange data with a first communication devices on a first communication channel, and
    receive collision information on a second communication channel that is a different channel than the first communication channel,
wherein the circuitry is configured to stop data transmission on the first communication channel if said collision information indicates that there is a collision on the first communication channel and/or to refrain from initiating data transmission on the first communication channel if said collision information indicates that the first communication channel is occupied by data transmission of another second communication device.

According to a further aspect there is provided a first communication method comprising
    exchanging data with one or more second communication devices on a first communication channel, and
    transmitting collision information on a second communication channel that is a different channel than the first communication channel,
wherein said collision information is transmitted if there is a collision on the first communication channel or if the first communication channel is occupied by data transmission of a second communication device, said collision information indicating that there is a collision on the first communication channel or that the first communication channel is occupied.

According to a further aspect there is provided a second communication method comprising
    exchanging data with a first communication devices on a first communication channel, and
    receiving collision information on a second communication channel that is a different channel than the first communication channel,
wherein data transmission is stopped on the first communication channel if said collision information indicates that there is a collision on the first communication channel and/or it is refrained from initiating data transmission on the first communication channel if said collision information indicates that the first communication channel is occupied by data transmission of another second communication device.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed communication methods, the disclosed computer program and the disclosed computer-readable recording medium have similar and/or identical further embodiments as the claimed communication device and as defined in the dependent claims and/or disclosed herein.

One of the aspects of embodiments of the disclosure is to avoid collisions or at least weaken their effect by enabling transmitting communication devices (i.e., second communication devices, such as transmitting stations (STAs)) to detect if they are causing interference and/or if their transmission is subject to interference. Based on this knowledge, transmitting communication devices take appropriate actions so that the collision is resolved or avoided. A receiving communication device (i.e., a first communication device, such as a receiving access point (AP)) is enabled according to the present disclosure to transmit collision information if needed that enables the transmitting stations to detect if they are causing interference and/or if their transmission is subject to interference. Another aspect of embodiments of the disclosure is to enable communication devices to adapt their channel access behavior so that futile access attempts are avoided.

The communication devices according to the present disclosure have access to two separate communication channels. Channel 1 is generally provided for contention and data exchange (i.e., for downlink (from AP to non-AP STA) and uplink (from non-AP STA to AP)), whereas channel 2 is generally provided for collision resolution (CR) (i.e., for restricted downlink or for uplink and downlink). Both channels may have a different bandwidth, as the CR channel typically requires lower bandwidth.

The collision information is transmitted on the collision resolution channel (channel 2).

In particular, the collision information indicates that there is a collision and is transmitted if there is a collision on the data exchange channel (channel 1). For example, the collision information may be transmitted as an interference notification frame, which may preferably include information about which transmitting communication device may continue transmitting or which transmitting communication device should stop transmitting.

Alternatively or additionally, the collision information indicates that the data exchange channel is occupied and is transmitted if the data exchange channel (channel 1) is occupied by data transmission. For example, the data exchange channel may be considered to be occupied by data transmission if data transmission is currently ongoing, or if data transmission is imminent (e. g. after data transmission has been announced by control information such as contained in CTS frames or after an AP has received an RTS frame and replies/is preparing to reply with a CTS frame). For example, the collision information may be transmitted as a transmission notification frame and preferably include the expected duration of a data transfer and/or NAV information.

Embodiments of the disclosure are particularly suitable as a modification of existing WLAN systems, methods and/or devices as described in the IEEE 802.11 standards.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
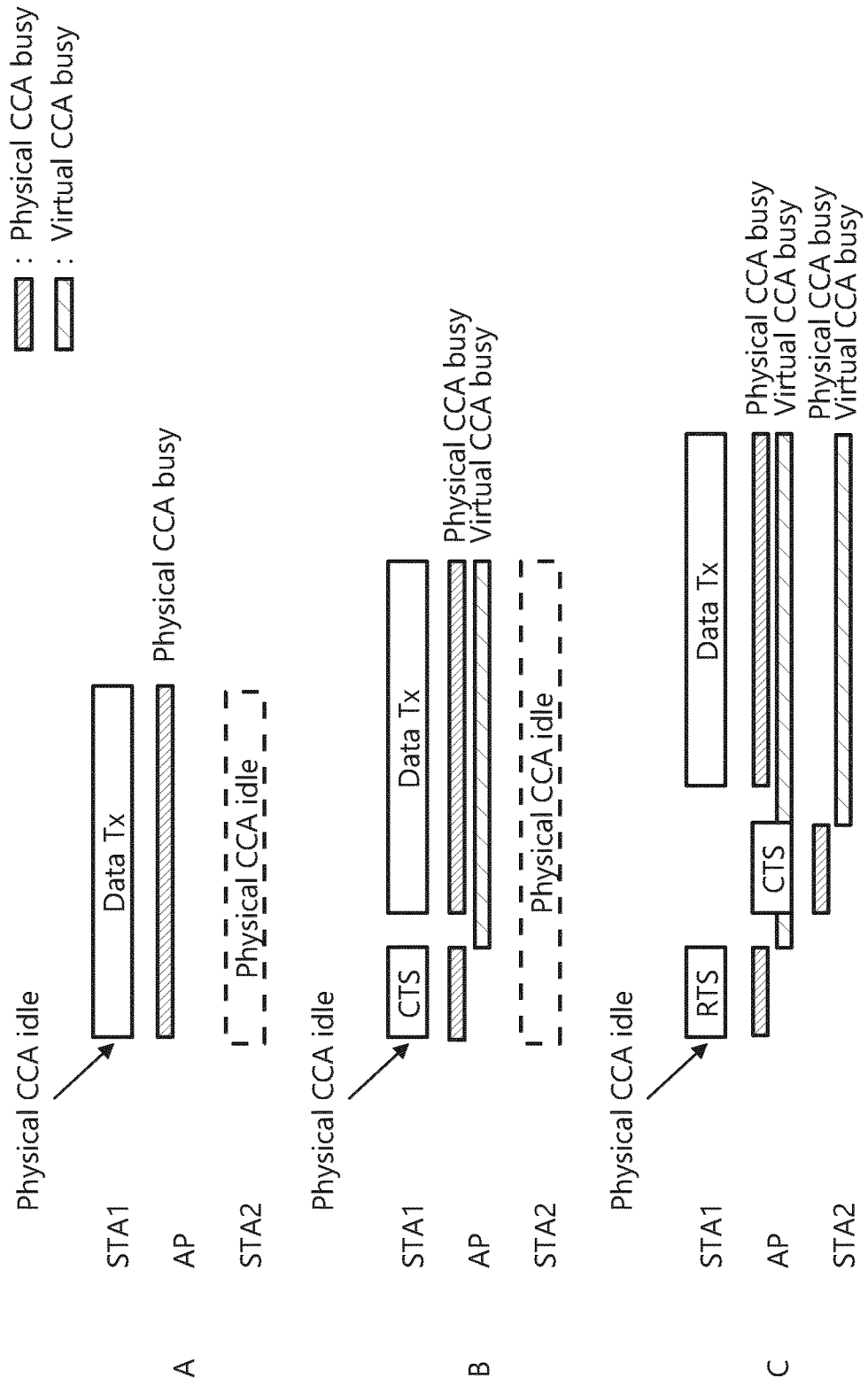
FIG. 1 shows a schematic diagram illustrating the virtual CCA methods.

In general, concepts or methods to avoid or minimize collisions may be classified into two categories of channel access. The first category is named physical channel clear assessment (physical CCA) and comprises concepts like LBT, which are often enforced by regulations imposed by regulatory authorities such as ETSI or FCC. The second category is named virtual channel clear assessment (virtual CCA) and comprises communication standard specific methods to protect transmitted data. Any standard may define its concepts of virtual CCA differently, whereas interoperability (often) requires communications systems to comply with physical CCA concepts.

In order to minimize the number of collisions, WLAN based on the IEEE 802.11 standards implements CSMA/CA (carrier sense multiple access/collision avoidance) by LBT as a base line. In contention-based channel access or distributed channel access (DCA), physical CCA requires any wireless station (STA) to monitor the physical activity on the wireless medium before transmitting any data. A time interval, also known as backoff period, determines how long a STA needs to listen to the wireless medium before it may transmit data. Various aspects, such as priority of data traffic and how often a STA was required to defer channel access due to a busy channel, determine the backoff period. The longer the backoff period is, the higher is the likelihood that another STA is going to transmit before the first STA. Consequently, a short backoff period is advantageous to gain channel access. This physical CCA concept is performed before any initial channel access, i.e. before the first frame of a series of frames is transmitted. The frames of a series of frames are separated by a time period which is smaller than the smallest backoff period. Consequently, no other STA than the responding STA can access the medium in the meantime, i.e. in the time between two subsequent frames.

In addition, WLAN implements different kinds of virtual CCA to minimize the effect of collisions further. These concepts partly rely on an exchange of control frames such as RTS (ready to send), CTS (clear to send) frames. Those frames hold information about how long an expected transmission will take. This is often referred to as network allocation vector (NAV). It gives an indication to STAs when the medium is going to be idle and thus available for other STAs.

In the following, when referring to the channel being sensed idle, this means that either physical CCA or physical and virtual CCA sensed the channel to be idle. The short inter frame spacing (SIFS) is a time interval in between two frames which amounts to 3 μs (11ad) or 16 μs (11 ac, 5 GHz).

The following channel access procedures are sorted by increasing protection level, i.e. interference by third party STAs is most unlikely for the last item:

a) A STA senses the channel idle and transmits a data frame.

b) A STA senses the channel idle and transmits a CTS frame first; it waits for a short time period (SIFS) and transmits a data frame.

c) An initiator STA senses the channel idle and transmits an RTS frame, then the responder STA transmits a CTS frame after SIFS; the initiator STA transmits a data frame SIFS after having received the CTS frame.

For example, each STA may determine which protection level to apply to data transmission, e.g. based on a priority of the data transmission and/or a transmit time of a data transmission, and select between the above channel access procedures accordingly. In other examples, an AP may determine which protection level is to be applied for communication in its BSS, and may inform the associated STAs of the corresponding channel access procedure (which may e. g. be a function of transmit time of a data transmission).

In this context it shall be noted that an AP shall generally be understood as an entity that provides PHY and MAC interface to the wireless medium and that provides access to distribution services via the wireless medium for associated STAs. An STA shall generally be understood is an entity that provides PHY and MAC interface to the wireless medium. It may associate to an AP to get access to distribution services.

Procedure a) corresponds to a physical CCA only; no virtual CCA is applied. A STA operating according to procedure b) adverts its expected transmission time (transmit opportunity—TXOP) to its vicinity. As STAs that are far away from a transmitting STA may not receive the CTS, they may access the channel and cause a collision at the peer STA of the transmitting STA. For this reason, procedure c) implements a bidirectional message exchange between the transmitting STA (RTS) and its peer STA (CTS) so that the expected transmit time is known to third party STAs in vicinity of both STAs.

FIG. 1 shows a schematic diagram illustrating the virtual CCA methods. It assumes that STA1 and STA2 (generally also called "second communication devices" herein) can hear the AP (generally also called "first communication device" herein), but STA1 cannot hear STA2 and vice versa. In this regard, the AP plays a special role as it can always hear all STAs. In the first case (FIG. 1A) neither CTS nor RTS is used. In the second case (FIG. 1B) CTS is used. In the third case (FIG. 10) CTS and RTS are used. It should be noted that an increasing level of protection comes with more overhead as transmission of one or more frames is required which results in lower efficiency.

Figure 2:
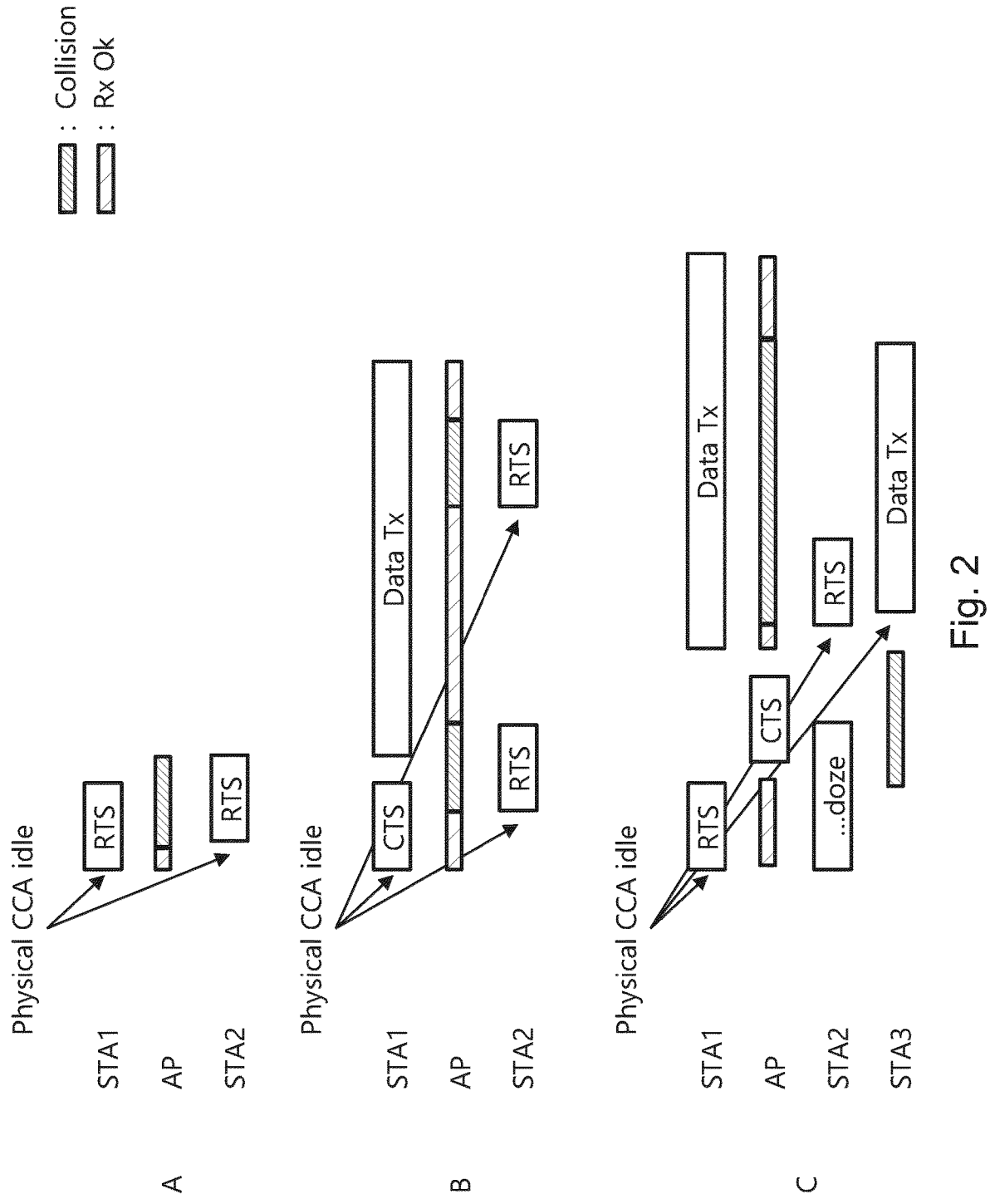
FIG. 2 shows a schematic diagram illustrating some exemplary scenarios.

Nevertheless, STAs may still interfere ongoing communications. FIG. 2 shows a schematic diagram illustrating some exemplary scenarios.

In the first case (FIG. 2A), two STAs, which are far away from each other, send RTS at roughly the same time. Since they do not receive each other, physical CCA does not respond.

In the second case (FIG. 2B), the root cause is the same as in first case. Although STA1 sends a CTS, the hidden node STA2 is not aware of STA1 transmitting. This example also shows that STA2 may repeat the RTS if it is expecting the AP to answer with a CTS. This shows that the STAs using different virtual CCA methods may cause problems.

In the third case (FIG. 2C), STA2 did not receive the CTS sent by AP because it has been in doze mode for example. The same reason may cause STA 3 to send data without any protection and creating a long duration interference to the STA1 to AP data transmission. In addition, STA 3 might have not received the CTS frame of the AP and missed virtual CCA information because it suffered (third party) interference at that time.

As a consequence of interference, an AP or a STA may not be able to decode the header of a PPDU transmitted by a peer STA or AP, for example. A receiver is thus unable to decode the transmitted PPDU. In such a case, the transmitted PPDU blocks the wireless medium although it cannot be decoded, and the transmitting STA or AP hinders other STAs or APs to access the medium.

It should understood that once a STA has acquired channel access by any means, i.e. at least physical channel access, it may consider to establish a transmit opportunity (TXOP). Within a TXOP several frames may be transmitted between two STAs including response frames (e.g. Ack or BAck). In this regard, the "Data Tx" box in the figures may comprise a burst of PPDUs, potentially separated by responses from the peer STA (e.g. Ack, BAck). Thus, a mutual change of the communication direction may be part of a TXOP.

In addition, reverse direction (RD) protocol may be applied during a TXOP, which involves that STAs exchange roles of primarily transmitting and receiving STA. This can be considered as an extension to TXOP, where the mutual change of communication direction is limited to responses by the peer STA only.

Furthermore, multiple STAs may transmit at the same time as part of an MU-PPDU. In this regard, STA1 may be considered as a group of STAs transmitting at same time on different PHY layer resources such as FDMA or MU-MIMO.

Figure 3:
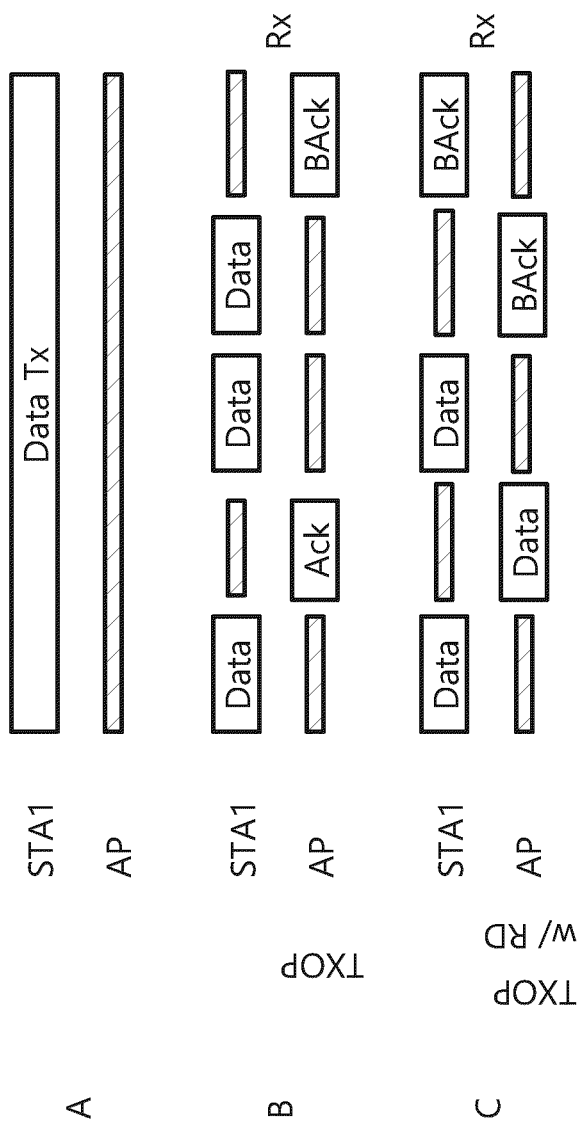
FIG. 3 shows a schematic diagram of an example of a single data transmission and its relation to a transmit opportunity or transmit opportunity with reverse direction.

FIG. 3 shows a schematic diagram of an example of a single data transmission (FIG. 3A) and its relation to a TXOP (FIG. 3B) or TXOP with reverse direction (RD) (FIG. 3C). All three subfigures should be understood as a potential replacement for each other.

For the matter of completeness, WLAN provides also scheduled channel access such as PCF and HCCA or SP and TDD-SP in which the AP assigns transmit slots to STAs. These concepts are however rarely implemented and may not be appropriate in uni-censed-bands.

One of the elements of the present disclosure is to avoid collisions or to weaken their effect. Transmitting STAs are enabled to detect if they are causing interference and/or if their transmission is subject to interference. Based on this knowledge, STAs may take appropriate actions as will be outlined in more detail in the following. Hence, elements of this disclosure include a concept of one or more of collision resolution and avoidance in a two channel setup and frequency division duplex (FDD), interference notification via a secondary channel to trigger interfering STAs to stop transmission, transmission notification via a secondary channel to set NAV on another channel for more robust virtual CCA, and PHY and MAC signaling for fast and robust detection of interference and transmission notification frames.

One of the ideas is that every STA has access to two channels. Channel 1 (first communication channel) is for contention and data exchange, whereas channel 2 (second channel) is for collision resolution (CR). The two channels may have different bandwidth, as the CR channel requires typically lower bandwidth. It should be noted that the proposed operation is not FDD in the traditional sense because both Downlink (DL) and Uplink (UL) are generally possible on each of the channels. Traditionally, FDD employs one channel for DL and another channel for UL.

Figure 4:
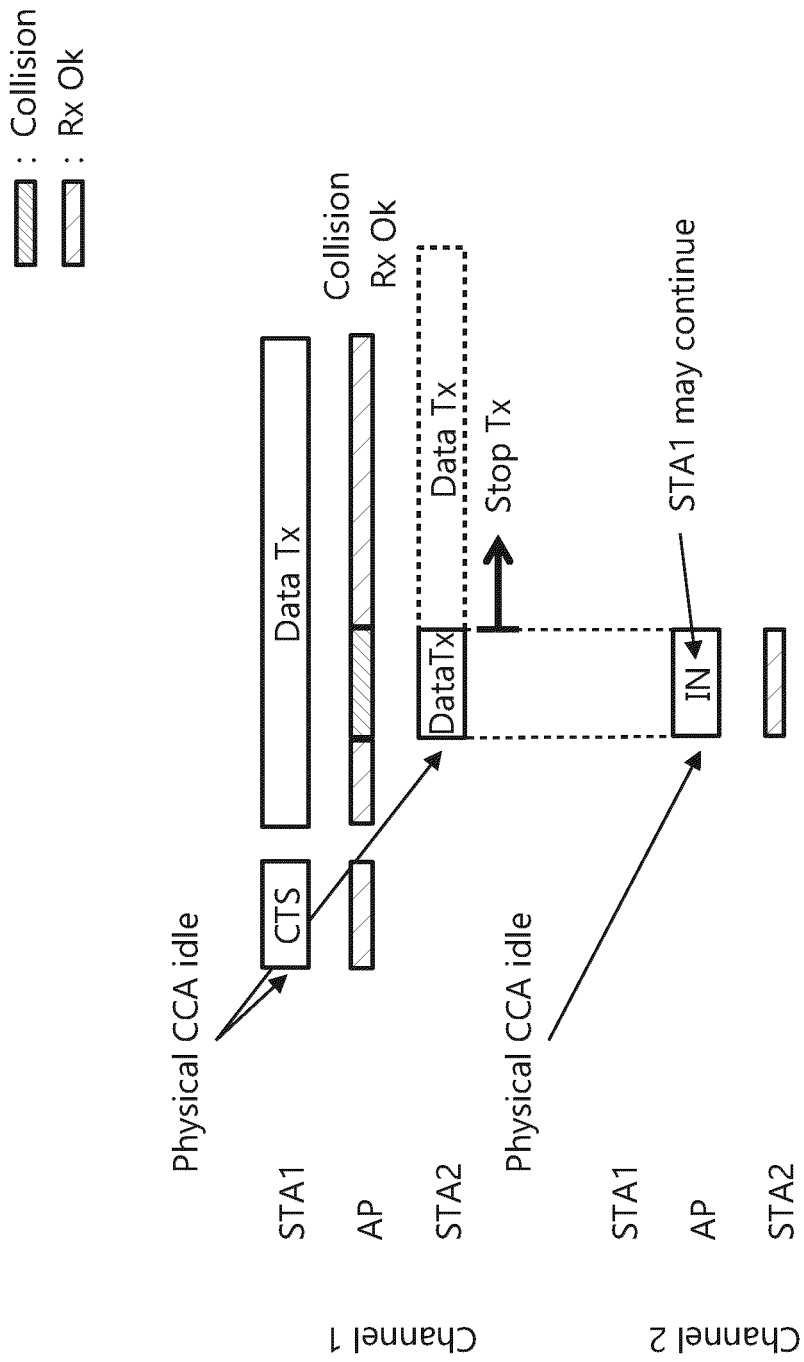
FIG. 4 shows a schematic diagram of a first embodiment of a communication method according to the present disclosure.

FIG. 4 shows a schematic diagram illustrating an embodiment of a communication method according to the present disclosure. On channel 1 regular contention for channel access and data transfer takes place, i.e. the rules described above for physical and virtual CCA apply. A STA transmitting data on channel 1 (i.e. that exchanges data with the AP on channel 1) shall also be able to receive on channel 2 while it is transmitting data on channel 1.

An AP receiving on channel 1 shall transmit an interference notification (IN) frame, which represents one embodiment of collision information, on channel 2 if it receives interference on channel 1. In one embodiment, the IN frame may just be a notification that interference is happening. In another embodiment, the IN may include information indicating which STA(s) may continue transmitting or which STA(s) shall stop transmitting. In general, it may be hard to identify which STA is interfering. For this reason, the IN may hold information about the peer STA(s) from which the AP transmitting the IN frame receives both data and interference. Those peer STA(s) are the STA(s) that may continue.

A transmitting STA shall stop transmitting on channel 1 if it receives an IN by which it is addressed. An addressed STA is a STA which identifies itself to stop transmitting based on the information in the received IN.

The assumption in the embodiment illustrated in FIG. 4 is that STA1 cannot receive STA2, but both STA1 and STA2 may hear the AP. STA1 starts transmitting data because physical and virtual CCA are idle. Although STA1 sends a CTS frame holding NAV information, STA2 starts transmitting data because it did not receive the CTS frame of STA1. Consequently, a collision arises at the AP, for which reason the AP may neither be able to decode data from STA1 nor from STA2. As soon as the AP detects the collision (this may come with a delay which is assumed to be zero in FIG. 4), it initiates transmission of an IN frame on channel 2 addressing STA2.

Upon initiation of transmission the AP tries to access the channel in accordance with applicable channel access rules. For example, a physical CCA like LBT may be applied for channel access to comply with regulations. In many embodiments, no channel access procedures other than those required by regulation are applied, because applying additional (virtual) CCA procedures would introduce a large overhead compared to the size of the collision information and delay channel access, and because a likelihood of collision should be rather low for the CR channel anyway.

As a consequence of compliance with channel access rules, there might be a (small) delay between initiating a transmission and the actual transmission. Nevertheless, STA2, listening to channel 2, receives the IN frame and stops its transmission on channel 1, for which reason interference at the AP vanishes, and the AP may continue receiving data from STA1.

If the source of interference in unknown, the IN frame is sent to all STAs in a broadcast mode. Each STA is required to decode the information included in the IN frame to determine if it should either continue or stop transmitting. It should be noted that the processing of the IN frame by STA2 may take time which results in a delay until it stops transmission on channel 1. FIG. 4 assumes this delay to be zero.

The IN frame sent by AP may contain an identifier of the STA(s) from which it is expecting to receive data or which are part of the current allocation, respectively. Thus, the IN frame may hold an identifier of STA1 in the example illustrated in FIG. 4. The identifier may be the MAC address of a STA or the AID (association identifier) of a STA which is a number assigned by the AP after a STA has been associated.

In a modified embodiment, if a STA has successfully established a TXOP via an RTS/CTS exchange, i.e. it received a CTS response by its AP, it is not required to listen to channel 2. This is applicable because this particular STA will not be requested to stop transmission by the AP inside the basic service set (inside BSS, called IBSS) of the AP. However, STAs outside the BSS (OBSS) may still request this STA to stop transmission. In this regard, performance of this modified embodiment is the same when compared to the embodiment in IBSS and the same when compared to the performance of legacy devices in OBSS. It should be noted that, since the transmitting STA is not listening to channel 2, it may not comply with the request to stop transmission in case a PPDU header decoding error has occurred. With respect to this particular case, the IBSS performance is deteriorated.

In further embodiments, the IN frame may hold additional information. The addition of additional information makes the IN frame longer which causes a larger delay in stopping transmission of an interfering STA. For this reason, an information splitting may be applicable as described below.

The following information may be added to the IN frame:
Remaining duration of the current TXOP. This is the NAV information of the AP. This is beneficial for the interfering STA as it may update its outdated or incomplete NAV information. Thus, virtual CCA will prevent this STA to access the channel again before the end of the current TXOP. This is a very important information for interfering STAs because it will avoid interference by multiple RTS frames during an ongoing data transmission (as shown in FIG. 2B).

Information about planned allocations. This is a list of time intervals during which the wireless medium is expected to be busy. Alternatively, information about free (non-allocated) time slots may be included. This is a list of time intervals during which the wireless medium is expected to be free. This is beneficial for the interfering STA in order to determine when it may access the channel in future.

Information about when interference started and/or when it ended. This is beneficial for the transmitting STA in order to determine which parts (e.g. MPDUs) of the transmitted data should be repeated in the current TXOP to increase the likelihood of a successful reception of these messages and thus lowering latency.

Information about type or bandwidth of interference. This may include parameters like PER or SNR during interference and bandwidth. This is beneficial for the transmitting STA in order to determine the effects of interference and if the transmission should be reconfigured to change reliability, e.g. change of modulation and coding or bandwidth.

Information about recommended mitigation strategies for the peer STA to be applied in order to lower impact of interference. This may include a recommended MCS (modulation coding scheme) to have a more robust reception with lower SINR. This may also include different settings for BAck operation or the BAck information itself.

Figure 5:
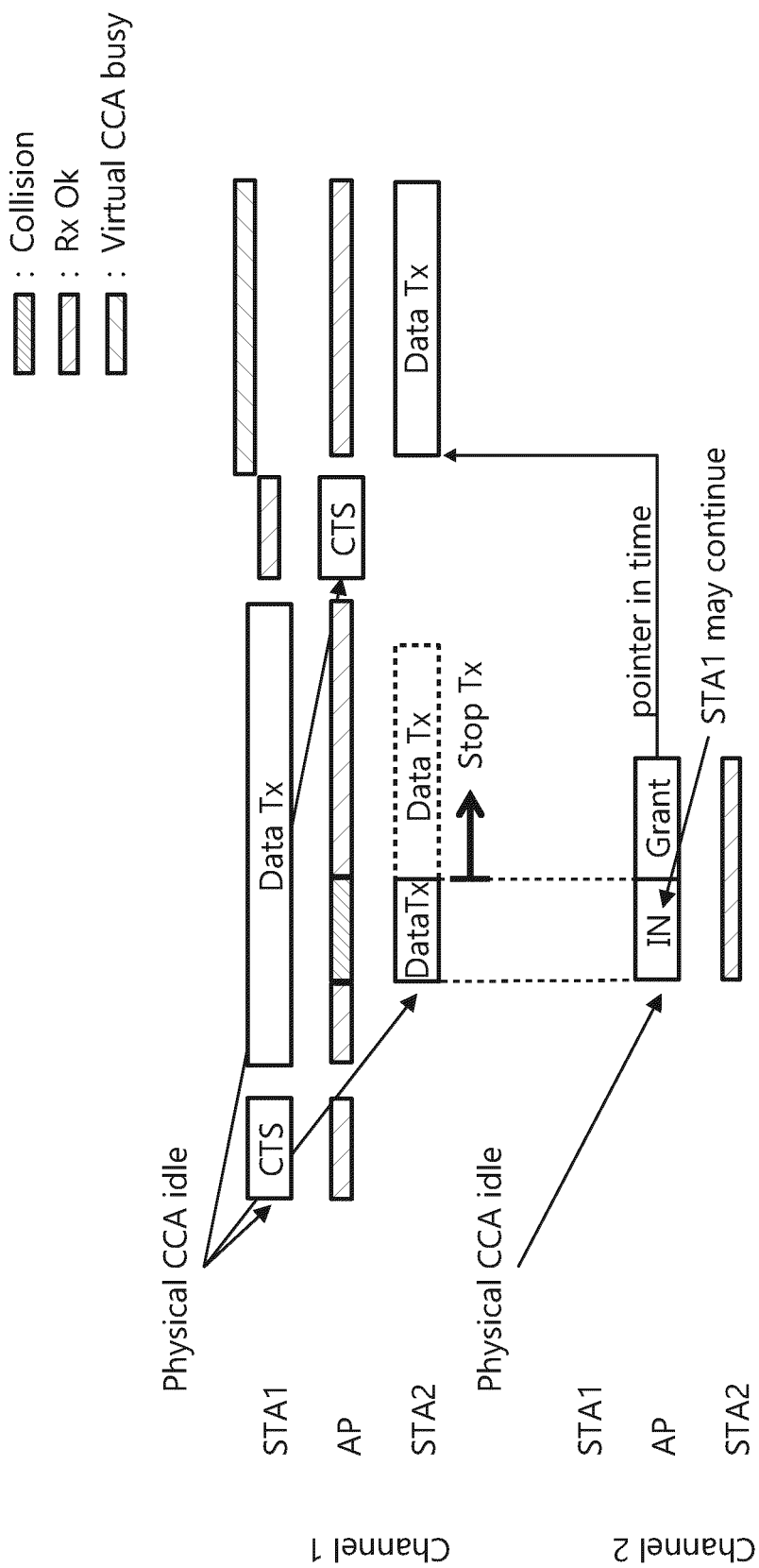
FIG. 5 shows a schematic diagram of a second embodiment of the communication method according to the present disclosure.

Information about when the interfering STA (if known) may access the channel in future, e.g. a future transmission grant. This transmission grant is preferably mirrored by the AP on channel 1, so that STAs which are not listening to channel 2 or which have not received the grant information, are aware of this allocation. For example, the AP may send a CTS frame just before the granted allocation on channel 1 with related NAV information. FIG. 5 shows a schematic diagram of another embodiment of the disclosed communication method illustrating this operation in more detail. In addition, in order to achieve maximum protection by virtual CCA, the peer STA addressed by the grant (this is the formerly interfering STA) may also send a CTS frame prior to user data communications. This is, however, mainly beneficial for OBSS protection as the CTS by the AP should be heard by all STAs of the BSS.

Obviously, a transmitting STA has clear benefits when listening to the CR channel, as it can retrieve additional information and take appropriate actions. Even if no additional information is added to the IN frame, based on the knowledge that interference occurred the transmitting STA may request a reception confirmation Ack/BlockAck of its peer STA in order to determine which MPDUs need to be retransmitted before continuing data transfer. This helps to reduce latency and buffer requirements at the receiving STA.

Embodiments described above which relate to collision information of an interference notification type require a modification of legacy WLAN STAs/APs, or new STAs/APs that support the embodiments. However, these embodiments have a clear benefit mainly if a certain amount of new/modified STAs is deployed in the field. In view of this, further embodiments providing (additionally or alternatively) collision information of another type (a transmission notification type) are described in the following. These embodiments have a clear benefit for new/modified STAs as soon as the AP supports the embodiments. The embodiments which relate to collision information of an interference notification type are independent from the embodiments which relate to transmission notification type described in the following, but both types of collision information may be used in combination if desired.

Figure 6:
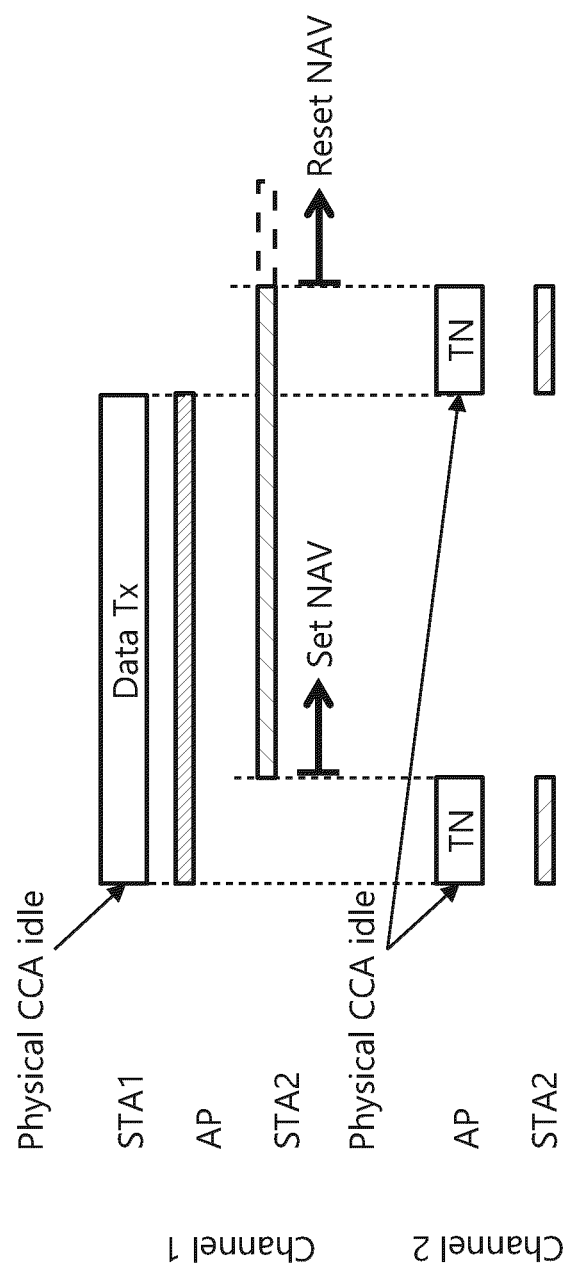
FIG. 6 shows a schematic diagram of a third embodiment of the communication method according to the present disclosure.

An embodiment of the envisioned operation is as follows (in the following, a legacy STA is a STA that does not implement one or more essential elements of the disclosed scheme; if a legacy STA initiates a data transmission with the AP, the AP shall take actions described below):

If a legacy STA initiates data transmission without prior RTS or CTS on channel 1, the AP shall send a transmission notification (TN) frame, which represents another embodiment of collision information, on channel 2 indicating that a STA initiated data transfer (that is, that channel 2 is occupied by data transmission). If the duration of this data transfer is known, it should be included into this frame. In case the duration is unknown, the AP shall send a TN frame on channel 2 indicating that the transmitting STA stopped data transfer once the STA stopped data transmission on channel 1. This is illustrated in FIG. 6. The AP transmits the TN on channel 2 once it is aware of a data transmission of STA1 on channel 1. After successful reception of the TN, STA2 sets the NAV on channel 1, i.e. virtual CCA busy. Once the data transmission of STA1 ends, the AP transmits a TN on channel 2 indicating that STA1 stopped data transmission on channel 1. After reception on channel 2, STA2 resets the NAV on channel 1, i.e. virtual CCA idle.

Figure 7:
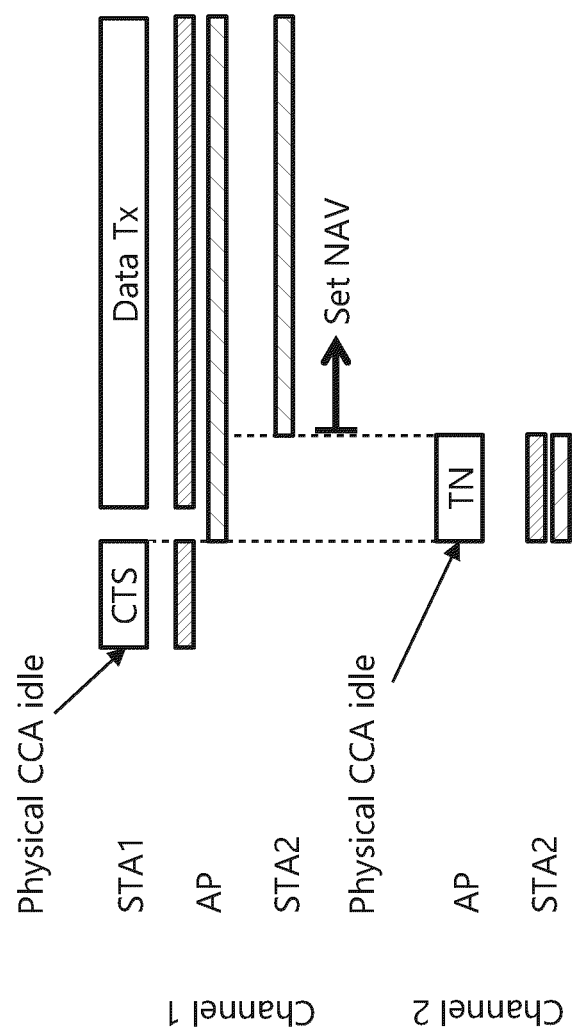
FIG. 7 shows a schematic diagram of a fourth embodiment of the communication method according to the present disclosure.

If a legacy STA transmits a CTS frame to initiate data transmission on channel 1, the AP shall send a TN frame on CR channel indicating that a STA initiated data transfer. Preferably, the TN frame contains the duration of the data transfer as contained in the CTS frame. This is illustrated in FIG. 7, where STA1 is a legacy STA and STA2 is a STA implementing the present disclosure. The AP transmits a TN frame on channel 2 as soon as it becomes aware of STA1's intention to transmit data, i.e. after reception of the CTS on channel 1. Upon reception of the TN frame by STA2 on channel 2, STA2 sets its NAV for channel 1.

Figure 8:
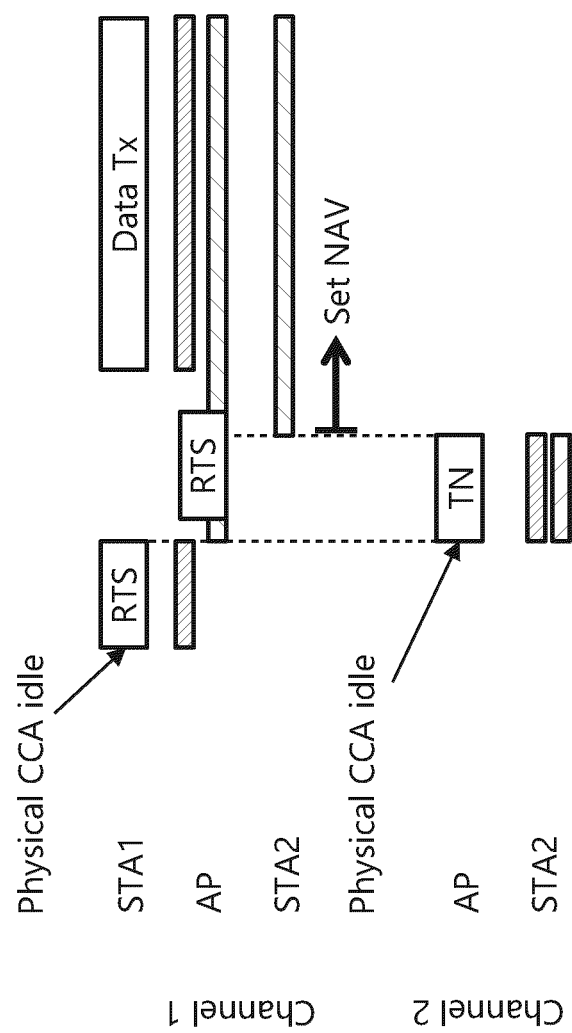
FIG. 8 shows a schematic diagram of a fifth embodiment of the communication method according to the present disclosure.

If a legacy STA transmits an RTS frame to initiate data transmission on channel 1 and the AP targets a CTS frame transmission on channel 1, the AP shall send a TN frame on channel 2 indicating that channel 1 is occupied by data transmission, preferably containing the duration of the data transfer as contained in the RTS or CTS frame. This is illustrated in FIG. 8, which is similar to FIG. 7 and where STA1 is a legacy STA and STA2 is a STA implementing the present disclosure. As soon as the AP is aware of the RTS content, it transmits a TN on channel 2 including the NAV information obtained from either the RTS or the CTS frame. Once STA2 receives the TN frame, it sets its NAV for channel 1 accordingly.

A new/modified STA implementing the present disclosure shall listen to channel 2 and take appropriate actions. In particular, it shall set its NAV value for channel 1 accordingly.

Optionally, the AP includes a STA identifier in the TN frames which identifies the STA that started or stopped transmission. This identifier may be a MAC address or an AID. Also, in an embodiment a TN frame may hold information about bandwidth or channel(s) used by that STA.

In case that a transmitting STA requires less time to transmit its data than indicated by some sort of virtual CCA announcement (e.g. RTS or CTS), it may reset the NAV by transmitting an appropriate indication, e.g. a CF-end frame in WLAN. When the AP receives such a frame, it may in one embodiment transmit a TN frame indicating that the current allocation ended (similar operation as shown in FIG. 6).

The IN frame and the TN frame described above are different embodiments of the collision information. The TN frame may be sent rather often, i.e. whenever a data transfer is initiated on channel 1, whereas the IN frame may only be transmitted when interference is present. The concept of IN or TN can be independently applied.

The embodiments described above assume intra-BSS operation, i.e. that all STAs are associated with the same AP on both channels. For inter-BSS operation, i.e. when STAs are associated to different APs, it may be beneficial that STAs are associated to different APs on channel 1 and channel 2, respectively.

Obviously, AP and (non-AP) STAs (i.e. STAs that are not contained within an AP) need to be aware of the channel allocation of both channels, as properties (e.g. center frequency) of channel 1 and/or 2 need to be known to both BSSes for successful operation. This information may be provided by a higher layer coordinator, i.e. the APs may be configured by a network coordinator unit. The APs could propagate this information to STAs during association process.

Figure 9:
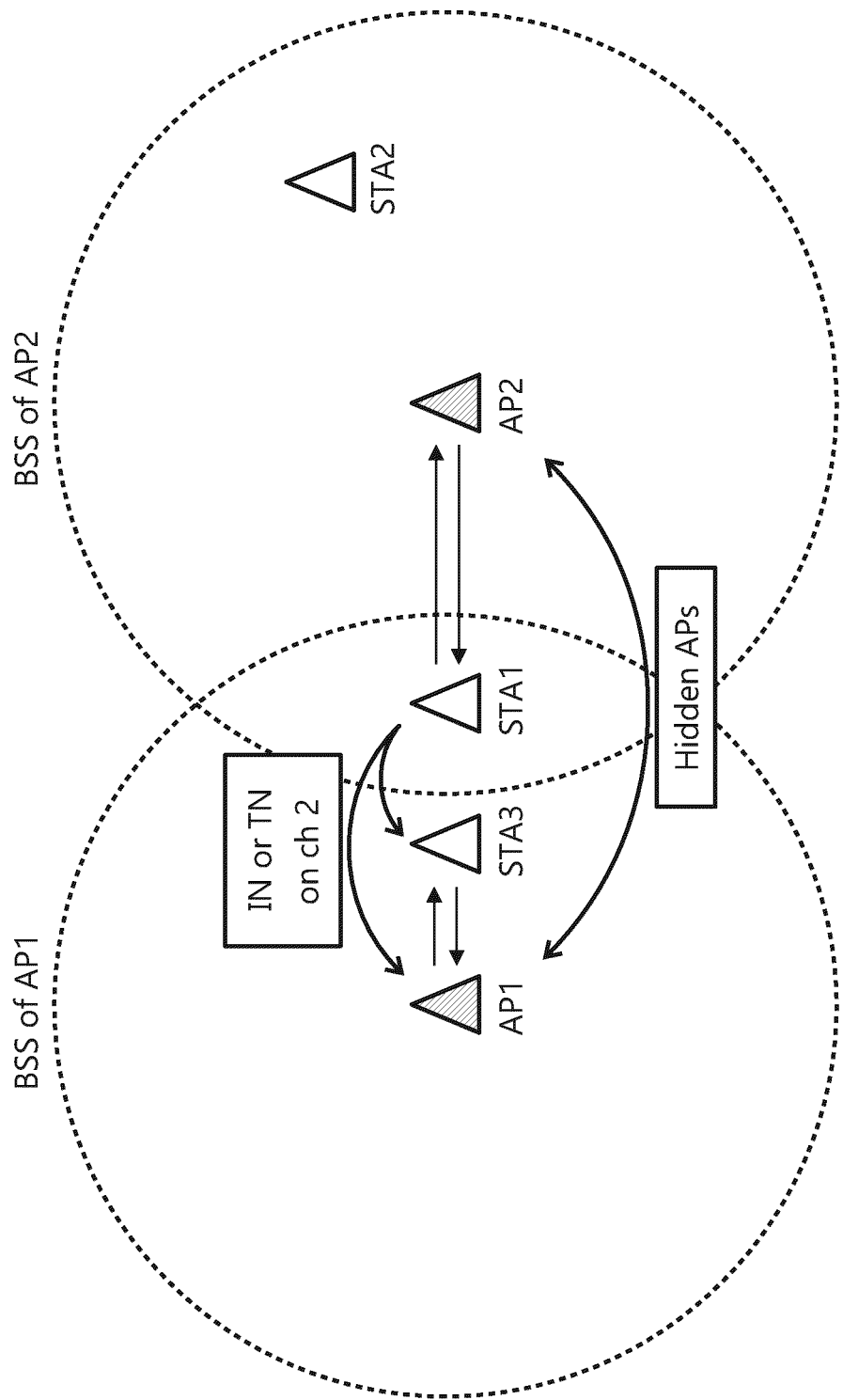
FIG. 9 shows an embodiment illustrating the operation with an example of two AP STAs.

For the inter-BSS operation, there may be not only hidden (non-AP) STAs but also hidden AP STAs (i.e. STAs that are contained within an AP). Therefore, according to some embodiments, non-AP STAs are able to access channel 2 in order to send an IN or TN frame. FIG. 9 shows an embodiment illustrating the operation with an example of two AP STAs (AP1 and AP2). The BSS created by AP1 holds STA3, whereas the BSS of AP2 contains STA1 and STA2. The coverage of both BSSes is indicated by the dashed circles. Within the coverage area of both BSSes only the AP creating the particular BSS is present. For this reason, AP1 cannot receive any signal from AP2 and vice versa. Consequently, both APs are hidden from each other.

STA1, which is exchanging data with AP2, may suffer interference from the AP1-STA3 link. As AP2 is unaware of this interference, it is not going to transmit an IN or TN frame, which would anyway not be received by AP1, as AP1 is outside the coverage area of AP2. In this situation, STA1 may send an IN or TN frame to indicate to AP1 and/or STA3 the presence of interference or the intention to transmit data, respectively.

Figure 10:
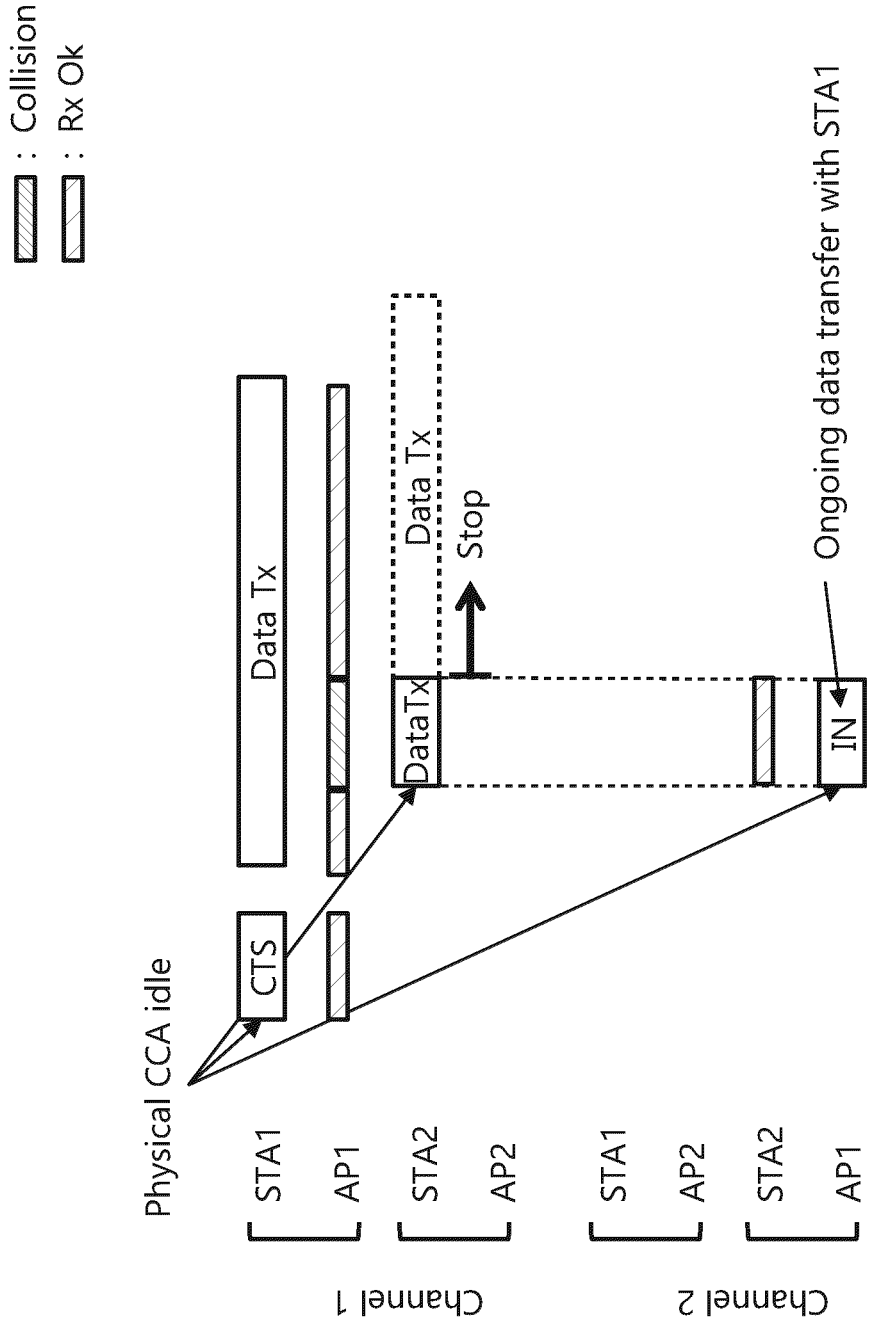
FIG. 10 shows a schematic diagram of a sixth embodiment of the communication method according to the present disclosure.

FIG. 10 shows an embodiment illustrating the operation according to FIG. 4, i.e. operation with CTS and IN frame, however in inter-BSS mode. On channel 1, STA1 is associated to AP1, whereas STA2 is associated to AP2. On channel 2, STA1 is associated to AP2, whereas STA2 is associated to AP1. Brackets indicate the association status on each channel. As described above, the assumption is that STA1 and STA2 can hear AP1 (and AP2, which is however not required for the envisioned operation depicted in FIG. 10), but both STAs cannot hear each other.

It is assumed that STA1 transfers data to AP1 and is interfered by STA2 which results in a collision at AP1. This collision triggers AP1 to send an IN frame on channel 2 addressing STA2, which causes STA2 to stop transmitting on channel 1. The different STA to AP association on different channels has the advantage that STA2 only has to listen to intra-BSS communication and AP1 may have a priori information from an initial association for channel 2, such as channel conditions and supported STA features. It would even allow for a bidirectional frame exchange, e.g. an ACK to the IN frame.

For the inter-BSS mode, additional useful information may be included into the IN frame. For instance, power control information may be included, i.e. the AP may recommend a transmit power value by which it would like the interfering STA to reduce its transmit power. The transmit power value may be chosen such that both the communicating STA and the interfering STA may transmit data at the same time, each to the AP it is associated to on channel 1. If the addressed STA complies with the recommended transmit power value it may continue transmission.

Figure 11:
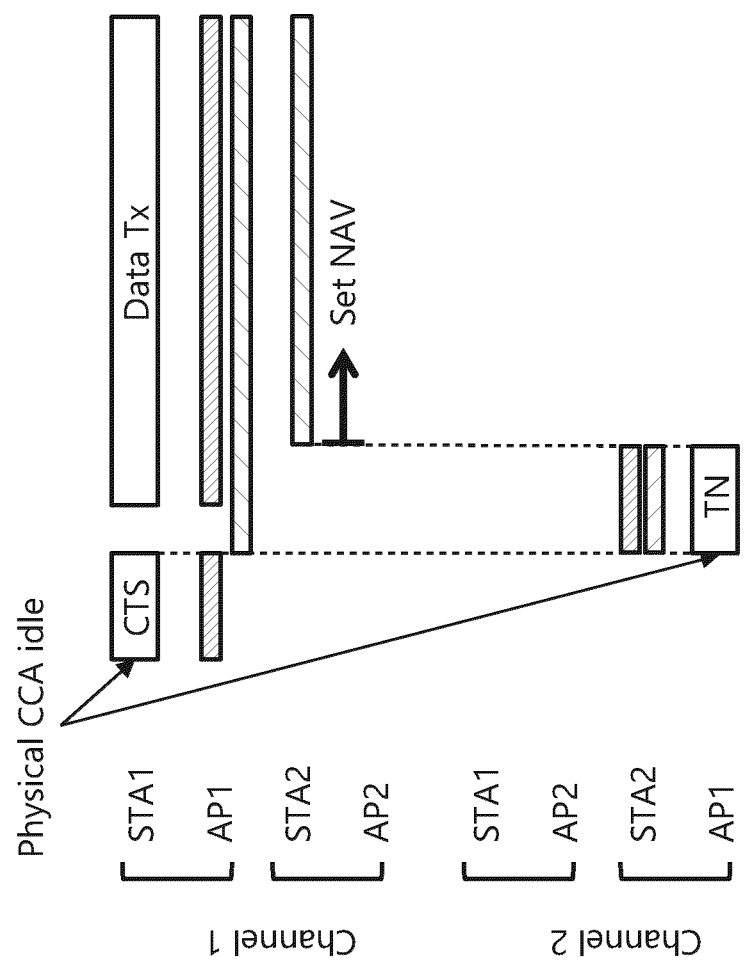
FIG. 11 shows a schematic diagram of a seventh embodiment of the communication method according to the present disclosure.

FIG. 11 shows a schematic diagram of a similar operation as shown in FIG. 7, i.e. operation with CTS and TN frame, however in inter-BSS mode. The assumptions are basically the same as the assumptions for FIG. 7. When AP1 receives a CTS frame and sets its NAV, it simultaneously initiates a transmission on channel 2, where STA2 is associated to AP1. After successful reception, STA2 sets its NAV on channel 1 accordingly. Advantages of this scheme are basically the same as in FIG. 10. As an additional advantage, AP1 may create a list of STAs which are hidden nodes to a particular STA and only address and transmit a TN frame to these STAs (such a hidden node list may also be created for the other embodiments disclosed herein with reference to both types of collision information).

Since STAs are mutually associated and APs are thus aware of communication properties and capabilities, APs may make use of multi-user communication features to shorten a transmission time of the TN frame.

In inter-BSS cases, the other AP2 may in one embodiment receive the IN or TN frame of AP1, optionally modify the frame content and retransmit it in its BSS, i.e. the AP2's BSS, to increase coverage. This requires that AP2 listens to APIs channel 2 without an association.

Further, it may be beneficial for a STA to identify early that a received frame is an IN or TN frame and its contents. For that reason, according to some embodiments, the information residing in IN or TN frames may be split, e.g. as follows: The header or SIG field of a frame holds the important information such as the type of frame, i.e. IN or TN, and other important information, such as which STA is addressed/which STA(s) may continue transmitting (IN) or NAV setting (TN frame). All other information which is less relevant but still valuable is contained in the payload of this frame.

If a STA receives a TN, indicating a transmission is just about to start, however it has not heard any corresponding RTS/CTS in the first communication channel, it may in an embodiment notify the AP, to allow the latter to create/update a hidden node list it may keep.

The header has the property that it is very robustly encoded and thus decodable for many STAs. In contrast, the payload robustness depends on the selected modulation and coding scheme (MCS). Thus, the transmitter determines coverage or range of this message.

Figure 12:
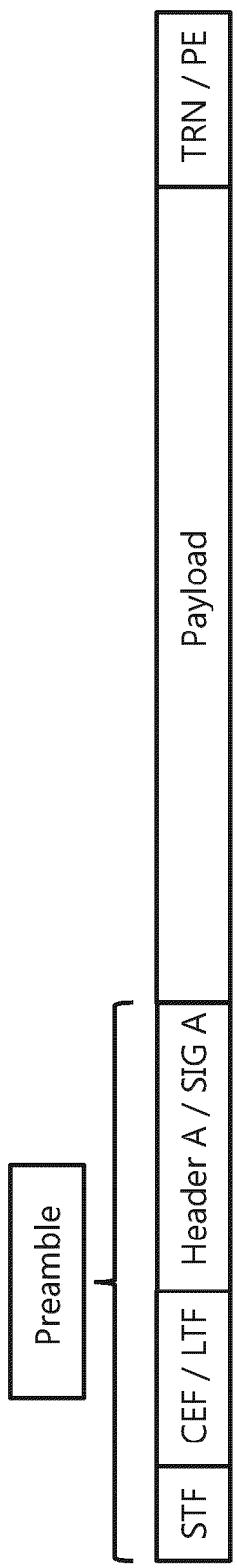
FIG. 12 shows a typical WLAN PHY frame (PPDU) structure.

FIG. 12 shows a typical WLAN PHY frame (PPDU) structure. According to an embodiment called herein advanced PHY PPDU, for IN or TN frames, the most important information resides in the preamble, e.g. Header A/SIG A, whereas the less relevant information resides in the payload.

Nonetheless, the addition of additional information makes the IN or TN frame longer which causes a larger delay in stopping transmission of an interfering STA.

Figure 13:
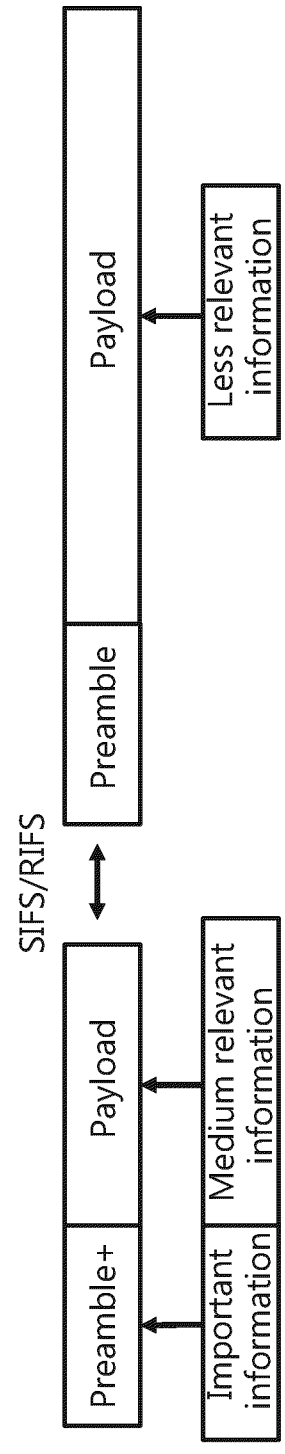
FIG. 13 shows two separate PPDUs with small inter frame spacing.

For this reason some embodiments additionally or alternatively split the IN or TN PPDU in two parts: The first part (which is transmitted first and/or with priority) holds the more important information (i.e. most important information and/or less relevant information), whereas the second part holds additional information. A STA receiving the first part shall take appropriate actions (e.g. stop transmitting) but keep receiving the second part to gain additional useful information. In WLAN, the two parts may be implemented as two separate PPDUs with small inter frame spacing (IFS) such as SIFS or RIFS (shown in FIG. 13). It may be envisioned that both parts are transmitted with different MCS, i.e. different reliability and/or different priorities (in the latter case, the interframe spacing may be longer than SIFS/RIFS and depends on the priority and channel load).

Both methods, i.e. the advanced PHY PPDU and splitting of PPDUs, may be independently applied.

In the following, a potential grading of information potentially contained in an IN or TN frame (in dependence on the embodiment) is provided. The grading may depend on the scenario and/or supported features.

The following information may be considered to be most important: STA which has to stop transmission or STA which may continue transmission (IN frame), expected duration of the data transfer, NAV information (TN frame). This information could in one embodiment be included in the preamble of an advanced PHY PPDU.

The following information may be considered to be medium relevant: NAV information of AP (IN frame), information about when interference started and/or when it ended (IN frame), information about type or bandwidth of interference (IN frame), power control information (OBSS IN frame). This information could in one embodiment be included in the payload of an advanced PHY PPDU.

The following information may be considered to be less important: Planned allocations (IN frame), information about recommended mitigation strategies for the peer STA to be applied in order to lower impact of interference (IN frame), information about when the interfering STA (if known) may access the channel in future, e.g. a future transmission grant (IN frame). This information could in one embodiment be included in the second part of a split PPDU.

In some embodiments, prior to regular communications, the AP may decide and announce if a CR channel is used. If a CR channel is used, the AP also announces a related CR channel identifier such as a channel number or center frequency and bandwidth. It should be noted that, if a STA does not support a CR channel, no behavior other than legacy needs to be defined.

The channel access in the CR channel may be as follows:

Direct access, i.e. no CCA or LBT. This may be applicable for licensed or slightly licensed bands such as the 6 to 7 GHz band.

LBT that may be applicable for unlicensed bands. In order to keep the latency low, the AP should be able to transmit a frame as soon as possible when it is necessary. Thus, the AP may listen for PIFS (priority inter frame spacing) to the wireless medium before transmitting. As an alternative, the AP may preemptively listen to the wireless medium in order to transmit immediately.

Figure 14:
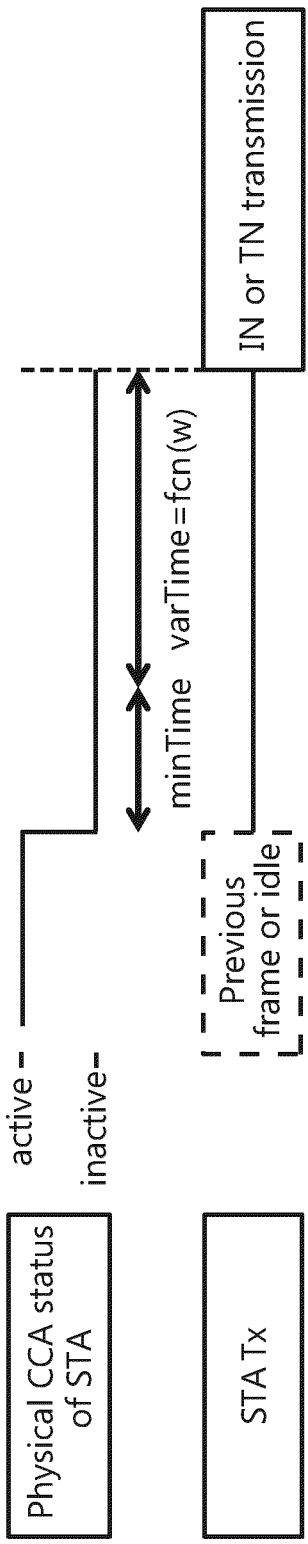
FIG. 14 shows a schematic diagram illustrating the principle of operation to transmit an IN or TN frame in a distributed system.

LBT with access prioritization for unlicensed bands. The impact of interference to a data transmission varies depending on several aspects of the data transmission, such as robustness (e.g. selected MCS), signal to interference level ratio, and signal to interference bandwidth ratio. These parameters determine how severe the impact of interference is and may thus be used to determine how fast an AP or STA may get channel access to channel 2 to transmit an IN or TN frame in a distributed system. FIG. 14 shows a schematic diagram illustrating the principle of operation: When the physical CCA status is getting inactive, the AP waits for a certain period before transmitting an IN or TN frame. The longer the AP has to wait, the less likely it will get channel access. The waiting time consists of two components, namely minTime, which is the minimum time span the AP listens to the medium before transmitting, and varTime, which is a variable time span the AP additionally listens to the medium before transmitting. The variable time span is parametrized by normalized values of signal to interference bandwidth, signal to interference level ratio, and/or robustness of transmit signal (e.g. MCS).

Figure 15:
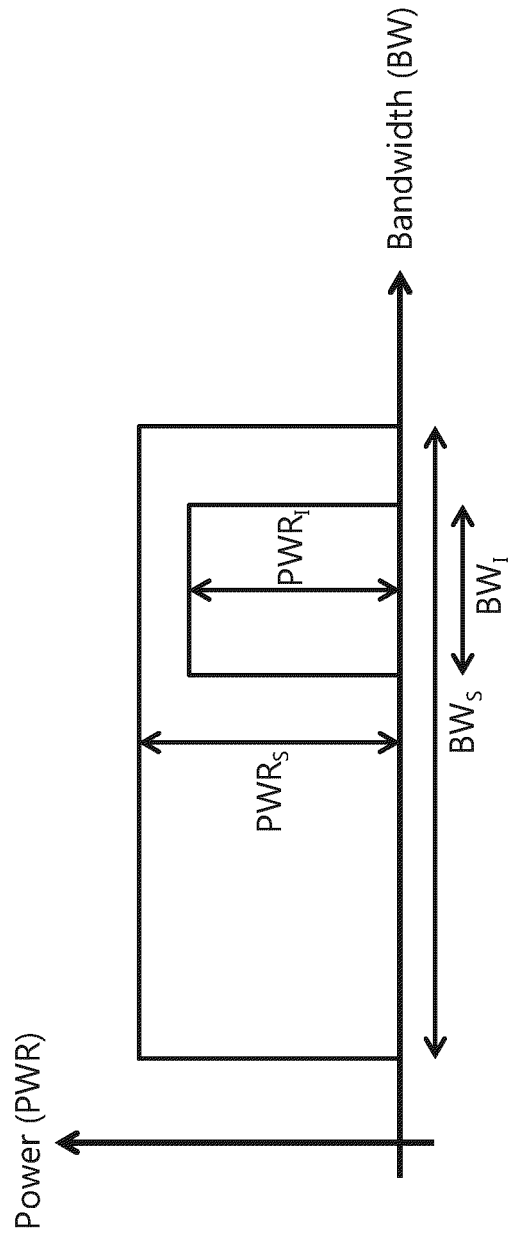
FIG. 15 shows exemplary spectral properties of signal and interference.

In the following, we show how an exemplary parameterization may be implemented. In this regard, FIG. 15 shows exemplary spectral properties of signal and interference. The assumption is that $BW_S$ and $BW_I$ indicate the bandwidth of signal and interference, respectively. Similarly, $PWR_S$ and $PWR_I$ denote the spectral power of signal and interference. It should be noted that in contrast to average power, the spectral power is normalized to bandwidth, e.g. W/Hz or dBm/Hz. The ratio of bandwidth and spectral power are defined as $b=BW_I/BW_S$ and $i=PWR_I/PWR_S$, respectively. There are various ways to define the robustness of the transmit signal. One option is to consider the ratio of actual packet error rate PER and target packet error rate $PER_T$. The normalized value is given by $p=PER/PER_T$. In order to control the length of the variable time span, a weighting value w may be computed which is a function of one or more parameters b, i, and/or p. The assumption is that a higher value of w yields faster channel access by lowering the variable time span. An exemplary implementation of w is as follows: $w=b/b_0 * i/i_0 * p/p_0$.

The predefined values $b_0$, $i_0$, and $p_0$ control the impact of each ratio to the weighting factor. If any of the values b, i, or p is unknown, due to limited STA capabilities for example, it may be set to respective predefined values. In a distributed system, the variable time span should be a random number in order to avoid collisions. In this regard, w controls the statistical properties of the variable time span such as mean value, variance or lower and upper boundaries.

In any case, the efficiency of the described scheme deteriorates when channel 2 is busy or occupied by other (data) traffic. For that reason, the channel 2 should not be used for data communications and transmitted frames should have a small transmission time. High priority should be provided to IN and TN frames on the CR channel.

According to an embodiment, the two-channel setup may be implemented using the channel aggregation (CA) principle of WLAN. According to that principle, two channels within the entire frequency band may be aggregated and used at same time in order to increase throughput. Up to now only channels with a same bandwidth may be aggregated, e.g. 20+20 (meaning two aggregated 20 MHz channels). However, this may be extended in the future to channels with unequal bandwidth, i.e. an 80+20 channel aggregation may be envisioned with the channels having 80 and 20 MHz, respectively. In contrast to CA, the channels envisioned by the present disclosure are used independently, aiming at making the data exchange on the data channel more effective by use of an additional channel.

The two channels used by a STA may be seen as two different resources that are independent in the sense that a STA may transmit and receive on both resources independently. Examples of such resources comprise
  two separate channels (as above);
  two spatial components such as horizontal and vertical or left hand and right hand sided polarization;
  two separate bands with a sufficient guard band to be able to separately transceive on both bands;
  two resource units (RU) within a OFDMA transmission in same band;

same channel when STAs support full-duplex operation. A full-duplex STA may send and receive data at the same time and on same resource.

Figure 16:
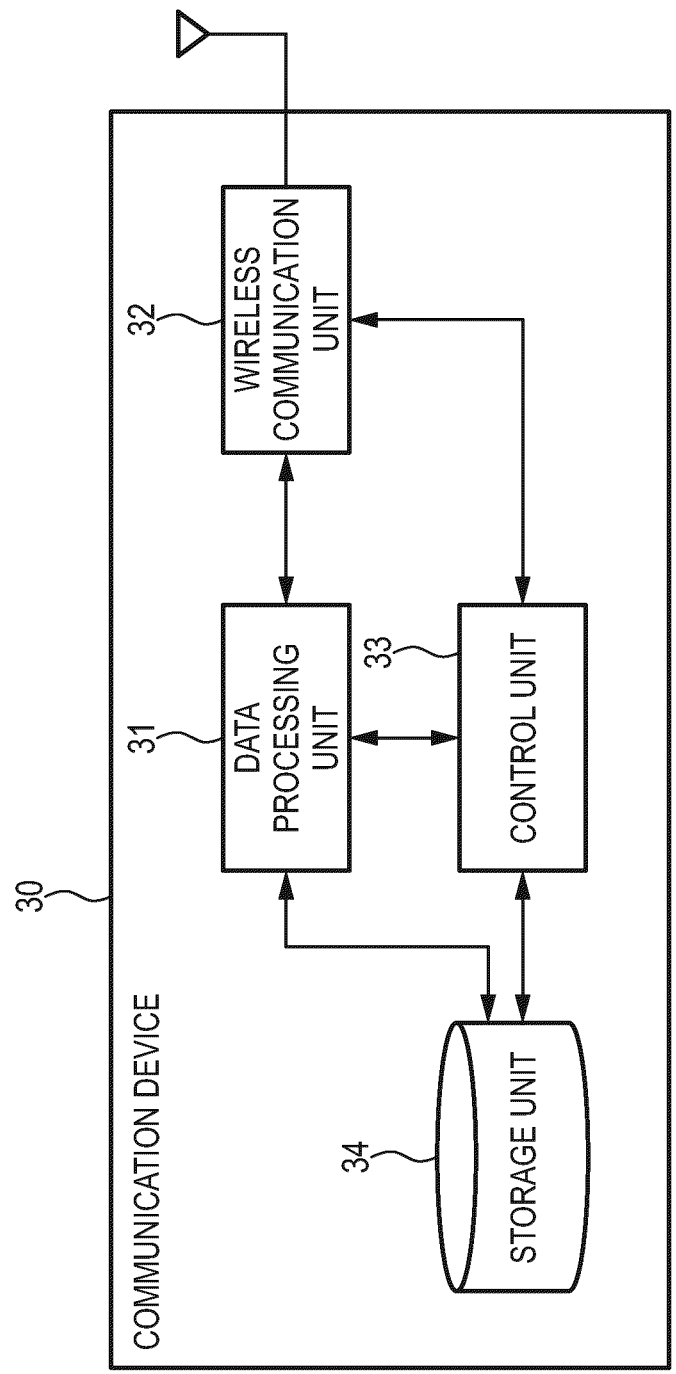
FIG. 16 shows a schematic diagram of the configuration of a first and second communication device according to an embodiment of the present disclosure.

The present disclosure provides one or more of the following advantages:
- collision resolution of colliding data frames;
- collision avoidance of data frames;
- OBSS collision resolution or avoidance;
- low latency data communications;
- lower retransmissions of interfered data frames;
- proposal of PPDU structures for fast detection of interference or fast NAV update;
- channel access scheme for IN and TN frame with priority depending on interference conditions FIG. 16 shows a schematic diagram of the configuration of a communication device 30 according to an embodiment of the present disclosure. Generally, each of the AP and the STAs may be configured as shown in FIG. 16 and may include a data processing unit 31, a wireless communication unit 32, a control unit 33, and a storage unit 34.

As a part of a communication device 30, the data processing unit 31 performs a process on data for transmission and reception. Specifically, the data processing unit 31 may generate a frame on the basis of data from a higher layer of the communication device 30, and may provide the generated frame to the wireless communication unit 32. For example, the data processing unit 31 generates a frame (in particular a MAC frame) from the data by performing processes such as fragmentation, segmentation, aggregation, addition of a MAC header for media access control (MAC), addition of an error detection code, or the like. In addition, the data processing unit 31 may extract data from the received frame, and provides the extracted data to the higher layer of the communication device 30. For example, the data processing unit 31 may acquire data by analyzing a MAC header and perform a reorder process, or the like with regard to the received frame.

The wireless communication unit 32 may have a signal processing function, a wireless interface function, and the like as part of a communication unit. Further, a beamforming function may be provided. This unit generates and sends PHY layer packets (or, in particular for a WLAN standard, PHY layer protocol data units (PPDU)), which have the physical representation of electric waveforms that can be radiated from one or multiple antennas and propagate in space.

The signal processing function is a function of performing signal processing such as modulation on frames. Specifically, the wireless communication unit 32 may perform encoding, interleaving, and/or modulation on the frame provided from the data processing unit 31 in accordance with a coding and modulation scheme set by the control unit 33, add a preamble and a PHY header, and generate a PHY layer packet. Further, the wireless communication unit 32 may recover a frame by performing demodulation, decoding, and the like on the PHY layer packet obtained by a process of the wireless interface function, and provide the obtained frame to the data processing unit 31 or the control unit 33.

The wireless interface function is a function to transmit/receive a signal via one or more antennas. Specifically, the wireless communication unit 32 may convert a signal related to the symbol stream obtained through the process performed by the signal processing function into an analog signal, amplify the signal, filter the signal, and up-convert the frequency (modulates the signal). Next, the wireless communication unit 32 may transmit the processed signal via the antenna. In addition, on the signal obtained via the antenna, the wireless communication unit 32 may perform a process that is opposite to the process at the time of signal transmission such as down-conversion of frequency (demodulation of the signal) or digital signal conversion.

The beamforming function may perform analog beamforming and/or digital beamforming, including beamforming training.

As a part of the communication unit, the control unit 33 (e.g., station management entity (SME)) may control the entire operation of the communication device 30. Specifically, the control unit 33 may perform a process such as exchange of information between functions, setting of communication parameters, or scheduling of frames (or packets) in the data processing unit 31.

The storage unit 34 may store information to be used for process to be performed by the data processing unit 31 or the control unit 33. Specifically, the storage unit 34 may store information stored in a transmission frame, information acquired from a receiving frame, information on a communication parameter, or the like.

In an alternative embodiment, the first and second communication devices, in particular each of the AP and the STAs, may be configured by use of circuitry that implements the units shown in FIG. 16 and the functions to be carried out. The circuitry may e.g. be realized by a programmed processor. Generally, the functionalities of first and second communication devices and the units of the communication device 30 shown in FIG. 16 may be implemented in software, hardware or a mix of software and hardware.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory mimohine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors, which are programmed or configured according to software code. A circuit does not include pure software, although a circuit includes the above-described hardware executing software.

It follows a list of further embodiments of the disclosed subject matter:

1. A first communication device comprising circuitry configured to
   exchange data with one or more second communication devices on a first communication channel, and
   transmit collision information on a second communication channel that is a different channel than the first communication channel,
   wherein the circuitry is configured to transmit said collision information if there is a collision on the first communication channel or if the first communication channel is occupied by data transmission of a second communication device, said collision information indicating that there is a collision on the first communication channel or that the first communication channel is occupied.

2. The first communication device as defined in any one of the preceding embodiments,
   wherein the circuitry is configured to transmit said collision information at least to one or more second communication devices that cause a collision and/or that shall not initiate data transmission on the first communication channel.

3. The first communication device as defined in any one of the preceding embodiments,
   wherein the circuitry is configured to transmit said collision information to all second communication devices.

4. The first communication device as defined in any one of the preceding embodiments,
   wherein said collision information comprises information indicating which second communication device shall continue data transmission on the first communication channel and/or which second communication device shall stop data transmission on the first communication channel and/or which second communication device shall not initiate data transmission on the first communication channel.

5. The first communication device as defined in any one of the preceding embodiments,
   wherein collision information comprises further information indicating one or more of
   the remaining duration of the current data transmission on the first communication channel;
   planned allocations of the first communication channel;
   start and/or end of an interference;
   type of an interference;
   bandwidth of an interference and/or channels on which interference occurred;
   one or more recommended measures of the second communication device that is allowed to continue data transmission to be applied for reducing the effect of an interference;
   time when a second communication device that shall stop or is currently not allowed to initiate data transmission on the first communication channel is expected to be allowed to start data transmission on the first communication channel.

6. The first communication device as defined in any one of the preceding embodiments,
   wherein the circuitry is configured to transmit collision end information on the second communication channel if a collision has ended and/or a second communication device that had transmitted data on the first communication channel stopped the data transmission, said collision end information indicating that a collision has ended and/or a second communication device that had transmitted data on the first communication channel stopped the data transmission.

7. The first communication device as defined in any one of the preceding embodiments,
   wherein the circuitry is configured to transmit collision information indicating the duration of data transmission of a second communication device on the first communication channel if it receives a clear to send and/or request to send notification from the second communication device on the first communication channel indicating said duration.

8. The first communication device as defined in any one of the preceding embodiments,
   wherein the circuitry is configured to transmit collision information including power reduction information if there is a collision on the first communication channel, said power reduction information indicating to a second communication device that it shall reduce transmit power and/or how much it shall reduce transmit power.

9. The first communication device as defined in any one of the preceding embodiments,
   wherein the circuitry is configured to create or update, for one or more of the second communication devices, a list of other second communication devices that cannot be heard by said second communication device and to transmit said collision information only to the other second communication devices provided in the list for a particular second communication device that is currently transmitting data on the first communication channel.

10. The first communication device as defined in any one of the preceding embodiments,
    wherein the circuitry is configured to transmit said collision information as different collision information portions, a first collision information portion including more important collision information and being transmitted before a second collision information portion including less important collision information.

11. The first communication device as claimed in claim 10,
    wherein the circuitry is configured to include the first collision information portion in a header of a collision frame or in a first protocol data unit and to include the second collision information portion in a payload of the collision frame or in a second protocol data unit.

12. The first communication device as defined in any one of the preceding embodiments,
    wherein the circuitry is configured to detect if there is a collision on the first communication channel or if the first communication channel is occupied by data transmission of a second communication device, and to generate said collision information if it is detected that there is a collision on the first communication channel or that the first communication channel is occupied by data transmission of a second communication device.

13. The first communication device as defined in any one of the preceding embodiments,
    wherein the circuitry is configured to transmit control information on the first communication channel, said control information indicating the presence and/or parameters of the second communication channel.

14. The first communication device as defined in any one of the preceding embodiments,
    wherein the circuitry is configured to get access to the second communication channel based on priority information or severity information, the priority information indicating the priority at which the first communication device can get access to the second communication channel and the severity information indicating how severe an interference is.

15. A second communication device comprising circuitry configured to
exchange data with a first communication device on a first communication channel, and
receive collision information on a second communication channel that is a different channel than the first communication channel,
wherein the circuitry is configured to stop data transmission on the first communication channel if said collision information indicates that there is a collision on the first communication channel and/or to refrain from initiating data transmission on the first communication channel if said collision information indicates that the first communication channel is occupied by data transmission of another second communication device.

16. The second communication device as defined in embodiment 15,
wherein the circuitry is configured to stop data transmission on the first communication channel and/or to refrain from initiating data transmission on the first communication channel if said collision information includes information indicating that the second communication device shall stop and/or not initiate data transmission on the first communication channel and/or if said collision information includes information indicating that another second communication device shall continue data transmission on the first communication channel.

17. The second communication device as defined in any one of embodiments 15 to 16,
wherein the circuitry is configured to set its network allocation vector for data transmission on the first communication channel according to the received collision information.

18. The second communication device as defined in any one of embodiments 15 to 17,
wherein the circuitry is configured to transmit collision information on the second communication channel.

19. The second communication device as defined in any one of embodiments 15 to 18,
wherein the circuitry is configured to send a hidden node notification to the first communication device indicating that a collision information has been received on the second communication channel, but no clear to send and/or request to send notification on the first communication channel has been sensed, the hidden node notification allowing the first communication device to create or update a list of other second communication devices that cannot be heard by said second communication device.

20. The second communication device as defined in any one of embodiments 15 to 19,
wherein the second communication device is inside a basic service set of the first communication device or outside the basic service set.

21. A first communication method comprising
exchanging data with one or more second communication devices on a first communication channel, and
transmitting collision information on a second communication channel that is a different channel than the first communication channel,
wherein said collision information is transmitted if there is a collision on the first communication channel or if the first communication channel is occupied by data transmission of a second communication device, said collision information indicating that there is a collision on the first communication channel or that the first communication channel is occupied.

22. A second communication method comprising
exchanging data with a first communication devices on a first communication channel, and
receiving collision information on a second communication channel that is a different channel than the first communication channel,
wherein data transmission is stopped on the first communication channel if said collision information indicates that there is a collision on the first communication channel and/or it is refrained from initiating data transmission on the first communication channel if said collision information indicates that the first communication channel is occupied by data transmission of another second communication device.

23. A non-transitory computer-readable recording medium that stores therein a computer program product, which, when executed by a processor, causes the method according to claim 21 or 22 to be performed.

24. A computer program comprising program code means for causing a computer to perform the steps of said method according to embodiment 21 or 22 when said computer program is carried out on a computer.

The invention claimed is:
1. A first communication device, other than an access point device, comprising circuitry configured to
exchange data with one or more access point devices on a first communication channel, and
transmit collision information on a second communication channel that is a different channel than the first communication channel and that has a different bandwidth than a bandwidth of the first communication channel,
wherein the circuitry is configured to transmit said collision information once the circuitry is aware that there is a collision on the first communication channel or once the circuitry is aware of data transmission of an access point device on the first communication channel or once the circuitry receives a clear-to-send (CTS) or a request-to-send (RTS) notification from the access point device on the first communication channel, said collision information indicating that there is a collision on the first communication channel or that the first communication channel is occupied, and
wherein the access point device, based on receipt of the collision information over the second communication channel,
continues data transmission on the first communication channel,
stops data transmission of the first communication channel, or
does not initiate data transmission on the first communication channel, and
wherein the collision information includes power reduction information if there is a collision on the first communication channel, said power reduction information indicating to an access point device that it shall reduce transmit power and/or how much it shall reduce transmit power, and further information indicating at least a type of an interference.

2. The first communication device as claimed in claim 1,
wherein the circuitry is configured to transmit said collision information at least to one or more access point devices that cause a collision and/or that are not initiate data transmission on the first communication channel and/or to transmit said collision information to all access point devices.

3. The first communication device as claimed in claim 1, wherein said collision information further comprises information indicating which access point device shall continue data transmission on the first communication channel and/or which access point device shall stop data transmission on the first communication channel and/or which access point device shall not initiate data transmission on the first communication channel.

4. The first communication device as claimed in claim 1, wherein the further information further indicates one or more of the remaining duration of the current data transmission on the first communication channel;

planned allocations of the first communication channel;

start and/or end of an interference;

bandwidth of an interference and/or channels on which interference occurred;

one or more recommended measures of the access point device that is allowed to continue data transmission to be applied for reducing the effect of an interference;

time when an access point device that shall stop or is currently not allowed to initiate data transmission on the first communication channel is expected to be allowed to start data transmission on the first communication channel.

5. The first communication device as claimed in claim 1, wherein the circuitry is configured to transmit collision end information on the second communication channel if a collision has ended and/or an access point device that had transmitted data on the first communication channel stopped the data transmission, said collision end information indicating that a collision has ended and/or an access point device that had transmitted data on the first communication channel stopped the data transmission.

6. The first communication device as claimed in claim 1, wherein the circuitry is configured to transmit collision information indicating the duration of data transmission of an access point device on the first communication channel if it receives a clear to send and/or request to send notification from the access point device on the first communication channel indicating said duration.

7. The first communication device as claimed in claim 1, wherein the circuitry is configured to create or update, for one or more of the access point devices, a list of other access point devices that cannot be heard by said access point device and to transmit said collision information only to the other access point devices provided in the list for a particular access point device that is currently transmitting data on the first communication channel.

8. The first communication device as claimed in claim 1, wherein the circuitry is configured to transmit said collision information as different collision information portions, a first collision information portion including more important collision information and being transmitted before a second collision information portion including less important collision information and/or to include the first collision information portion in a header of a collision frame or in a first protocol data unit and to include the second collision information portion in a payload of the collision frame or in a second protocol data unit.

9. The first communication device as claimed in claim 1, wherein the circuitry is configured to detect if there is a collision on the first communication channel or if the first communication channel is occupied by data transmission of an access point device, and to generate said collision information if it is detected that there is a collision on the first communication channel or that the first communication channel is occupied by data transmission of an access point device.

10. The first communication device as claimed in claim 1, wherein the circuitry is configured to transmit control information on the first communication channel, said control information indicating the presence and/or parameters of the second communication channel.

11. The first communication device as claimed in claim 1, wherein the circuitry is configured to get access to the second communication channel based on priority information or severity information, the priority information indicating the priority at which the first communication device can get access to the second communication channel and the severity information indicating how severe an interference is.

12. An access point device comprising circuitry configured to exchange data with a first communication device, other than an access point device, on a first communication channel, and receive collision information on a second communication channel that is a different channel than the first communication channel and that has a different bandwidth than a bandwidth of the first communication channel, wherein, based on receipt of the collision information over the second communication channel, the circuitry is configured to continue data transmission on the first communication channel, stop data transmission on the first communication channel, or refrain from initiating data transmission on the first communication channel, and wherein the collision information includes power reduction information if there is a collision on the first communication channel, said power reduction information indicating to an access point device that it shall reduce transmit power and/or how much it shall reduce transmit power, and further information indicating at least a type of an interference.

13. The access point device as claimed in claim 12, wherein the circuitry is configured to stop data transmission on the first communication channel and/or to refrain from initiating data transmission on the first communication channel if said collision information includes information indicating that the access point device shall stop and/or not initiate data transmission on the first communication channel and/or if said collision information includes information indicating that another access point device shall continue data transmission on the first communication channel.

14. The access point device as claimed in claim 12, wherein the circuitry is configured to set its network allocation vector for data transmission on the first communication channel according to the received collision information.

15. The access point device as claimed in claim 12, wherein the circuitry is configured to transmit collision information on the second communication channel.

16. The access point device as claimed in claim 12,
wherein the circuitry is configured to send a hidden node notification to the first communication device indicating that a collision information has been received on the second communication channel, but no clear to send and/or request to send notification on the first communication channel has been sensed, the hidden node notification allowing the first communication device to create or update a list of other access point devices that cannot be heard by said access point device.

17. The access point device as claimed in claim 12,
wherein the access point device is inside a basic service set of the first communication device or outside the basic service set.

18. A first communication method performed by a first communication device other than an access point device, comprising:
   exchanging data with one or more access point devices on a first communication channel, and
   transmitting collision information on a second communication channel that is a different channel than the first communication channel and that has a different bandwidth than a bandwidth of the first communication channel,
   wherein said collision information is transmitted once the first communication device becomes aware that there is a collision on the first communication channel or the first communication device becomes aware of data transmission of an access device on the first communication channel, or the first communication device receives a clear-to-send (CTS) or a request-to-send (RTS) notification from the access point device on the first communication channel, said collision information indicating that there is a collision on the first communication channel or that the first communication channel is occupied, and
   wherein the access point device, based on receipt of the collision information over the second communication channel,
      continues data transmission on the first communication channel,
      stops data transmission of the first communication channel, or
      does not initiate data transmission on the first communication channel, and
   wherein the collision information includes power reduction information if there is a collision on the first communication channel, said power reduction information indicating to an access point device that it shall reduce transmit power and/or how much it shall reduce transmit power, and further information indicating at least a type of an interference.

19. A second communication method performed by an access point device, comprising:
   exchanging data with a first communication devices, other than access point devices, on a first communication channel, and
   receiving collision information on a second communication channel that is a different channel than the first communication channel and that has a different bandwidth than a bandwidth of the first communication channel,
   wherein, based on receipt of the collision information over the second communication channel,
      data transmission by the access point device is continued on the first communication channel,
      data transmission by the access point device is stopped on the first communication channel, or
      the access point device is refrained from initiating data transmission on the first communication channel, and
   wherein the collision information includes power reduction information if there is a collision on the first communication channel, said power reduction information indicating to an access point device that it shall reduce transmit power and/or how much it shall reduce transmit power, and further information indicating at least a type of an interference.

20. A non-transitory computer-readable recording medium that stores therein a computer program product, which, when executed by a processor, causes the method according to claim 18 to be performed.

* * * * *